(12) United States Patent
Klink

(10) Patent No.: US 6,236,640 B1
(45) Date of Patent: May 22, 2001

(54) METHOD FOR ALTERNATE CIRCUITING OF TRANSMISSION EQUIPMENT IN RING ARCHITECTURES FOR BIDIRECTIONAL TRANSMISSION OF ATM CELLS

(75) Inventor: Joachim Klink, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/017,903

(22) Filed: Feb. 3, 1998

(30) Foreign Application Priority Data

Feb. 3, 1997 (DE) ............................................. 197 03 992

(51) Int. Cl.[7] .................................................. G01R 31/08
(52) U.S. Cl. ............................................................. 370/224
(58) Field of Search ................................... 370/217, 220, 370/222, 225, 260, 352, 405, 223, 224; 340/825.01; 714/712, 717

(56) References Cited

U.S. PATENT DOCUMENTS

| | | | |
|---|---|---|---|
| 5,327,427 | * 7/1994 | Sandesara | 370/85.14 |
| 5,426,420 | * 6/1995 | Nagler | 340/825.01 |
| 5,621,721 | * 4/1997 | Vatuone | 370/16 |
| 5,663,949 | * 9/1997 | Ishibashi et al. | 370/220 |
| 5,706,277 | * 1/1998 | Klink | 370/220 |
| 5,933,258 | * 8/1999 | Flanagan et al. | 359/110 |

* cited by examiner

Primary Examiner—Chau Nguyen
Assistant Examiner—Alexander Boakye
(74) Attorney, Agent, or Firm—Schiff Hardin & Waite

(57) ABSTRACT

The known alternate circuiting of ATM cells is efficiently controlled upon employment of linear structures. In order to also be able to transfer these structures to ring-shaped architectures, a ring-shaped structure is inventively formed of linear structures in that further linear structures are linked into the transmission section of a linear structure and the switching equipment of the original linear structure are brought together or merged. Further, a plurality of protection entities share a transmission capacity that is reserved in common.

14 Claims, 4 Drawing Sheets

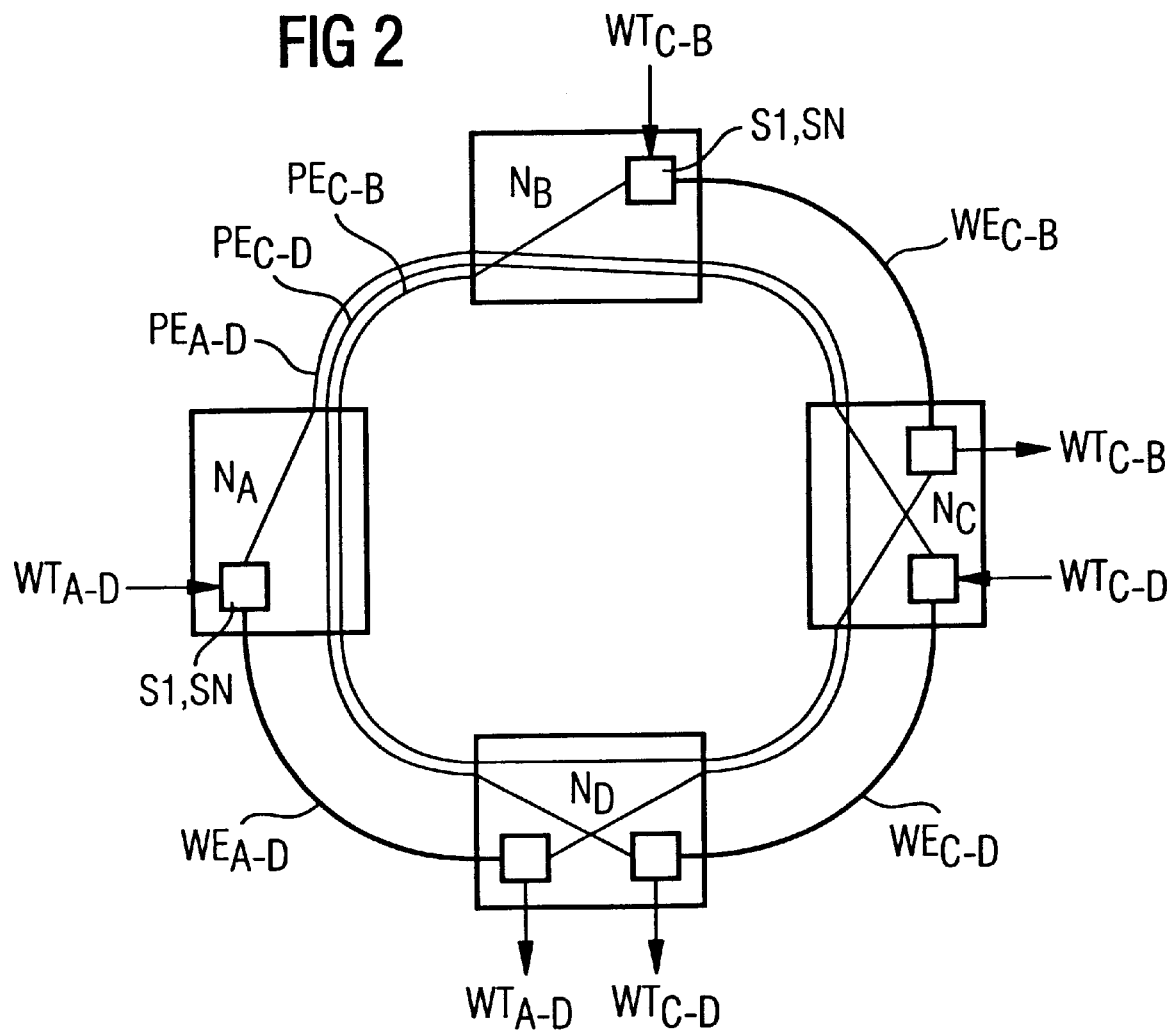

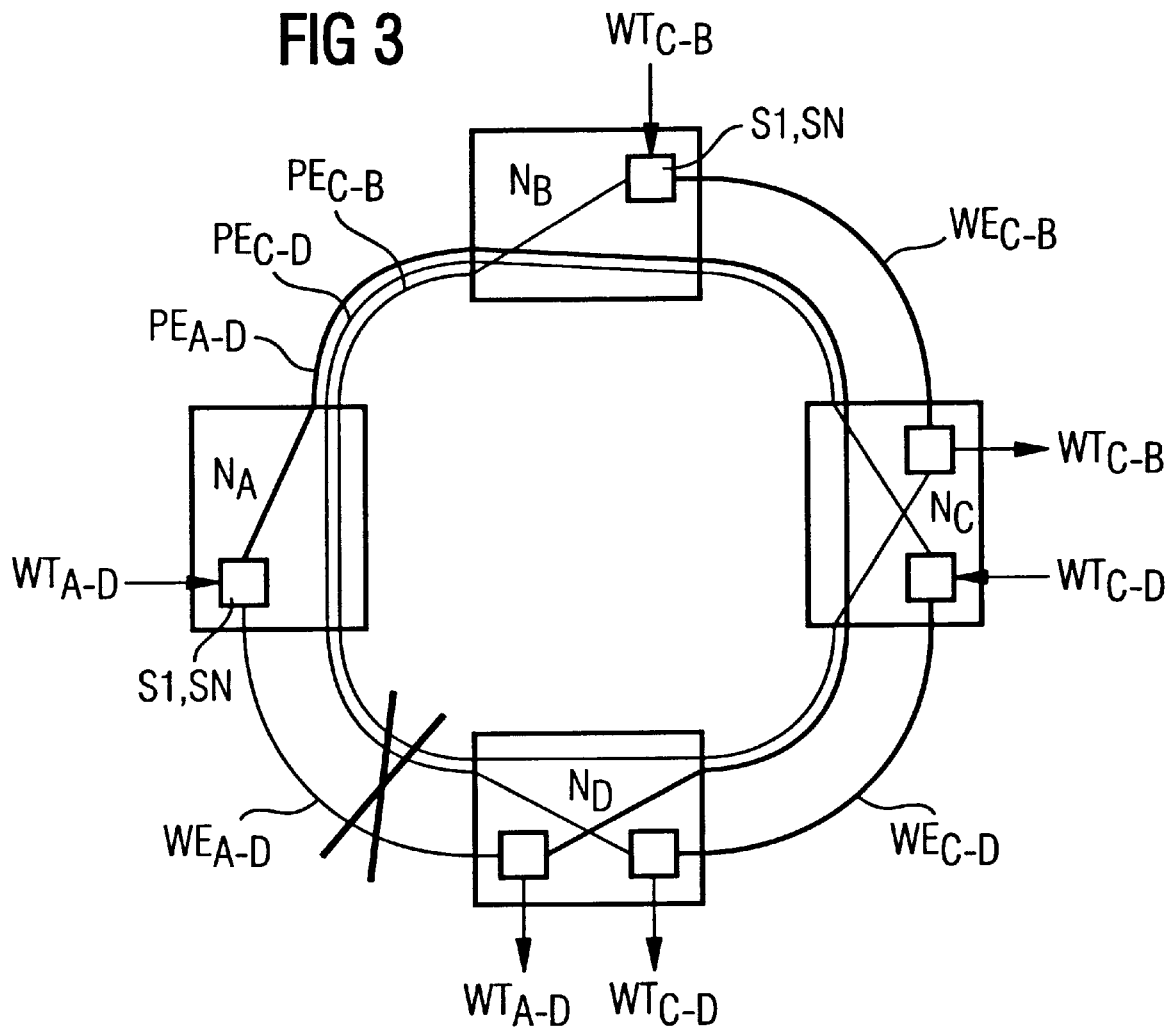

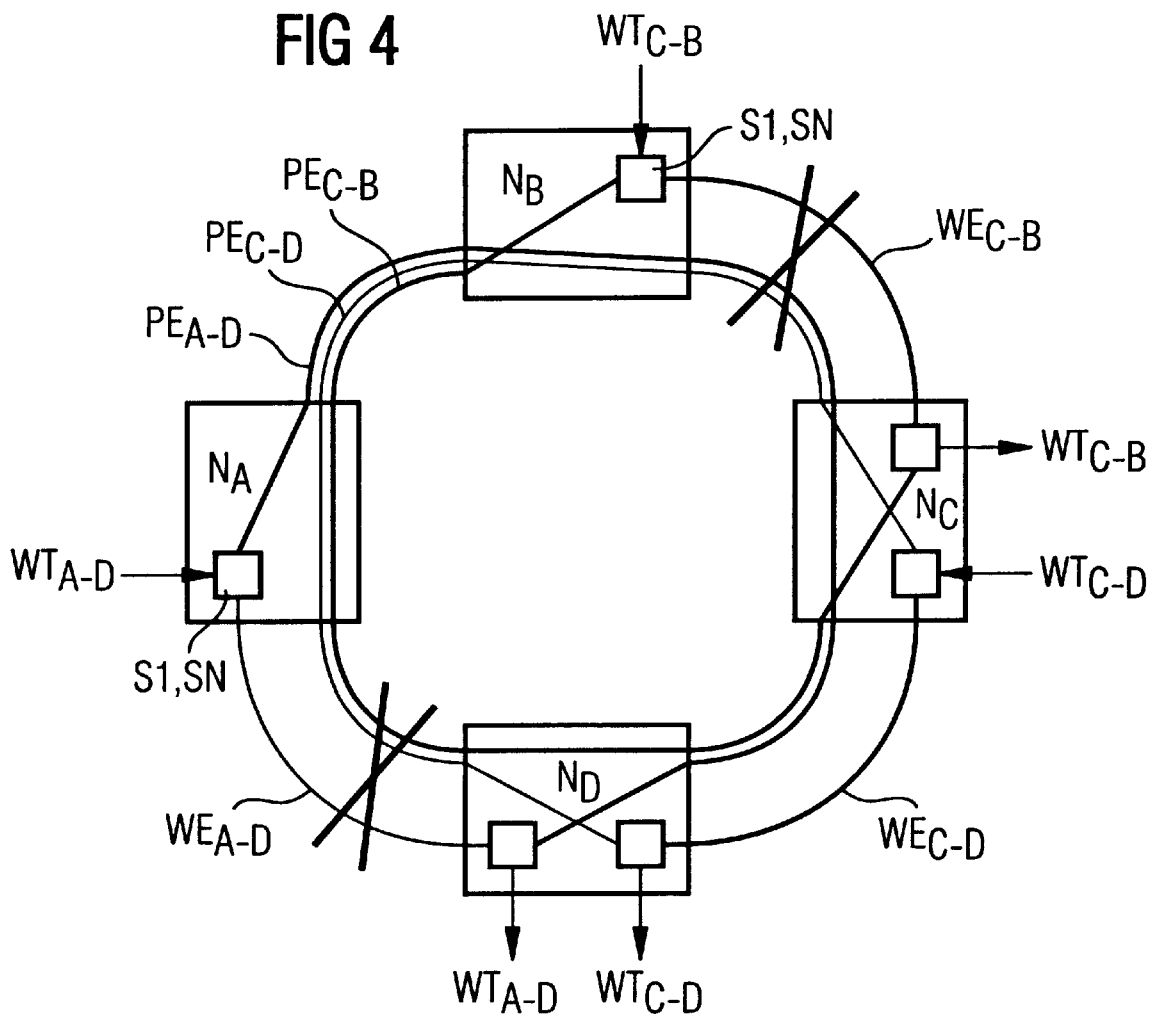

METHOD FOR ALTERNATE CIRCUITING OF TRANSMISSION EQUIPMENT IN RING ARCHITECTURES FOR BIDIRECTIONAL TRANSMISSION OF ATM CELLS

BACKGROUND OF THE INVENTION

1. Field of the Invention

The present invention is directed to a method for alternate circuiting, or routing, in bidirectional ATM cell transmission in a ring architecture.

2. Description of the Related Art

A method generally of the type described above is described in an unpublished German Patent application DE 19646016.6. In this known method, transmission equipment are provided for the bidirectional transmission of ATM (asynchronous transfer mode) cells, whereby two switching equipment which function as terminal points are connected to one another via a working entity and a protection entity. The two terminal points respectively contain a monitoring means for detecting transmission disturbances. A switch means that is controllable by the monitoring means connects the receiving terminal point to the working entity in a first switch condition and to the protection entity in a second switch condition. Control information are exchanged between the control devices of the two terminal points. The switch means is respectively controlled by the local monitoring means depending on local control criteria and on control criteria contained in the control information received from the cooperating location.

What is disadvantageous about the know method is that only the alternate circuiting, or routing, of transmission equipment between two terminal points is addressed. Since ring architectures are generally employed in a subscriber line network, this method cannot be employed in such networks.

SUMMARY OF THE INVENTION

The present invention is based on the object of improving a method of the type initially cited such that information that are transmitted according to an asynchronous transfer mode can be transmitted via a plurality of network nodes with great dependability.

The method of the invention provides for the alternate circuiting, or routing, of transmission equipment in ring architectures for the bidirectional transmission of ATM cells, including at least two switching equipment that respectively terminate a transmission section formed of working entities and/or protection entities and between which information is supplied in ATM cells via this transmission section, whereby, given a malfunction on the appertaining transmission section, the ATM cells hitherto transmitted thereover are potentially rerouted onto the protection entity according to priority criteria and logical connection information, a plurality of switching equipment are linked into the transmission section and the at least two switching equipment are brought together.

It is especially advantageous in the invention that a plurality of protection entities share a transmission capacity that is reserved in common.

Advantageous developments of the invention provide that the method has a protection entity respectively allocated to a working entity, whereby a plurality of protection entities can share a transmission capacity reserved in common.

In the alternate circuiting case, an alternate circuiting request is generated to which further priorities are allocated.

Preferably, the logical connection information is the number of a virtual channel and/or the number of a virtual path and/or the number of a virtual path group that is formed of a plurality of virtual paths. Local and global priority tables in which the rank of the priorities is determined are provided.

Upon arrival of an alternate circuiting request in the receiving switching equipment, an alternate circuiting protocol is generated that is supplied only once to the transmitting switching equipment via the protection entity. The total outage and degradation of a working entity are detected in the monitoring means of the receiving switching equipment. In one embodiment, the switching equipment are fashioned as cross-connect switch devices.

The alternate circuiting potentially ensues by driving a switch means contained in the transmitting switching equipment as well as upon employment of a selection means arranged in the receiving switching equipment.

Special data are transmitted over the protection entity during malfunction-free times. In particular, special data are ABR or UBR traffic data.

Preferably, the selection means is fashioned as ATM switching network and/or as simple switch element.

The alternate circuiting protocol of a preferred embodiment is cyclically exchanged between the transmitting switching equipment and the receiving switching equipment.

BRIEF DESCRIPTION OF THE DRAWINGS

The invention is explained in greater detail below with reference to an exemplary embodiment.

FIG. 2 is a schematic illustration of a ring-shaped configuration on which the inventive method is implemented;

FIG. 3 is a schematic illustration of the ring according to the inventive method in the case of a single error;

FIG. 4 is a schematic illustration of the ring according to the inventive method in the case of a double error.

DETAILED DESCRIPTION OF THE PREFERRED EMBODIMENTS

Figure 1:
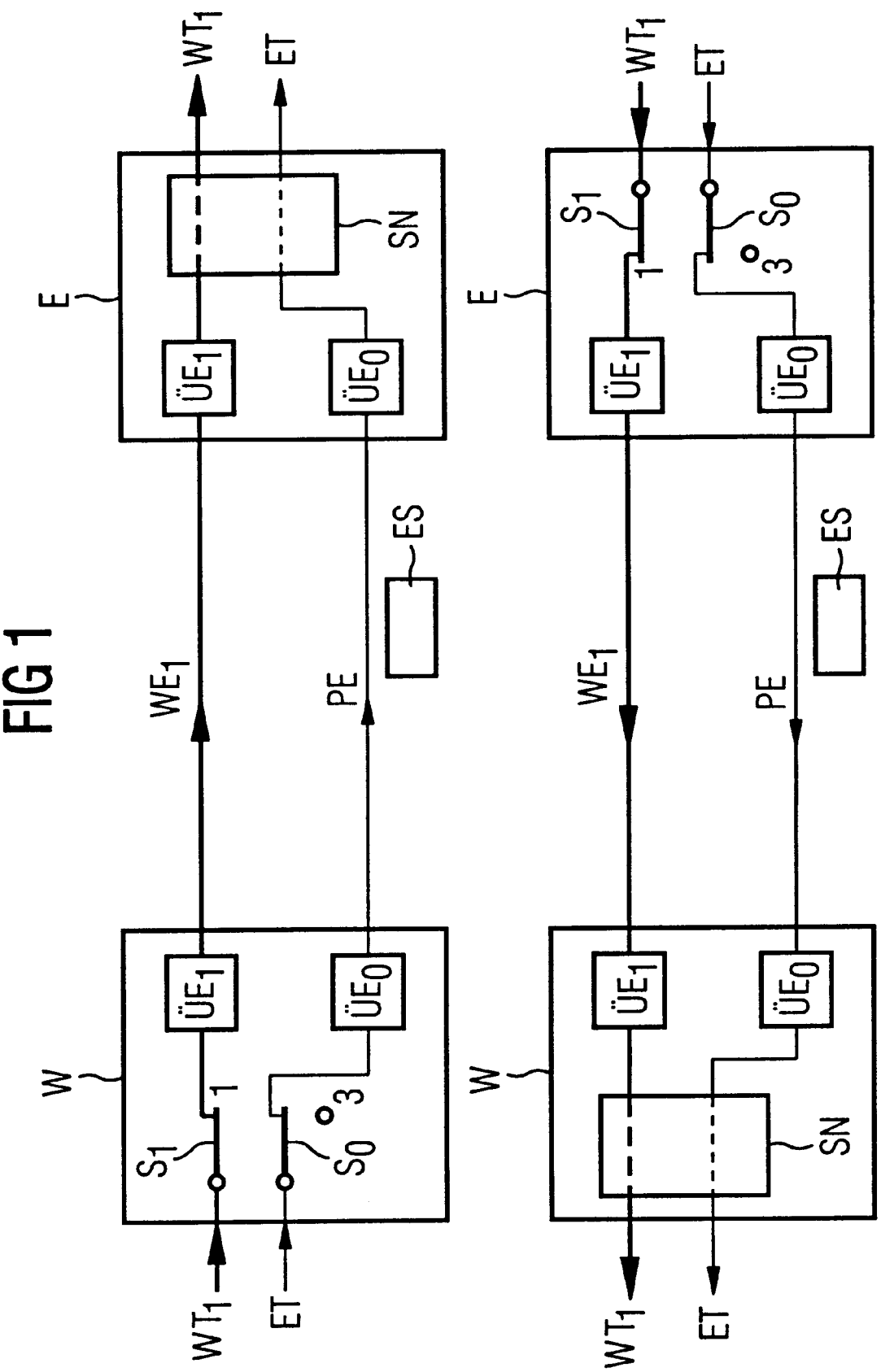
FIGS. 1a and 1b are block circuit diagrams of configurations for the bidirectional transmission of ATM cells in a linear 1 +1 structure.

FIG. 1 shows two nodes of an ATM network that are each respectively fashioned as switching equipment W and E. It is assumed in the present exemplary embodiment that these switching equipment are cross connect switching equipment. However, the employment of switching equipment fashioned in this way is not a limitation of the present invention; other switching equipment can likewise be employed. FIGS. 1a and 1b show the transmission of ATM cells from the switching equipment W to the switching equipment E and back; it is thus a bidirectional connection.

The ATM cells are transmitted according to an asynchronous transfer mode and respectively comprise a header part as well as an information part. The header part serves for the acceptance of connection information, whereas the information part is serviceable for the acceptance of useful information. The connection information contained in the header part is fashioned as logical information and is usually fashioned as a virtual path number VPI or, respectively, a virtual channel number VCI. A plurality of these virtual channel numbers VCI are thereby respectively combined to form a virtual path number VPI.

The switching equipment W and E are connected to one another via working entities, which are to be fashioned as a single working entity $WE_1$ according to the present exemplary embodiment, as well as via a protection entity PE. Further, switch devices $S_0$ and $S_1$ (bridges) via which the incoming ATM cells are optionally transmitted over the working entity $WE_1$ or the protection entity PE to the switching equipment E are shown.

Further, selection devices SN can be derived from FIG. 1 that are respectively allocated to the receiving switching equipment, their job being comprised in supplying the ATM cells transmitted via the working entity $WE_1$ to the output of the switching equipment E. According to the present embodiment, the selection devices SN are fashioned as an ATM switching network. Since it is a matter of bidirectional connections, the ATM switching network SN is contained both in the switching equipment W as well as the switching equipment E.

Further, monitoring devices $UE_0$ and $UE_1$ (a protection domain sink and a protection domain source) are shown in both switching equipment W and E that monitor that condition or, respectively, the quality of the ATM cells that are transmitted via the working entity $WE_1$. For example, the ATM cells of the connection having the number 1 $WT_1$ are provided with control information in the monitoring means $UE_1$ of the switching equipment W before they are transmitted via the working entity $WE_1$ to the switching equipment E, the monitoring means $UE_1$ of the receiving switching equipment E taking and checking these control information. A determination as to whether the transmission of the ATM cells has ensued correctly or not can then be made on the basis of these control information. In particular, a total outage (a signal failure for the working entity) of the working entity $WE_1$ can be detected here. Deteriorations in the transmission quality (signal degradation), however, can also be identified upon employment of known methods.

The monitoring device $UE_1$ terminates the working entity $WE_1$ at both sides. Further monitoring devices $UE_1$ are arranged at both ends of the protection entity PR. This is intended to serve as a transmission path for the deactivated working entity WE in case of a malfunction. Further, alternate circuit protocols ES are transmitted thereover, so that utmost priority is accorded the intactness of the protection entity.

Central control devices (which are not shown in detail in FIG. 1), further, are arranged in each of the switching equipment W and E. These respectively contain local and global priority tables. The status and priority of the appertaining local switching equipment are stored in the former, whereas the status and priority of the local as well as of the rest of the switching equipment is deposited in the latter. What the introduction of the priorities achieves is that, given the simultaneous occurrence of a plurality of alternate circuit requests—given the presence of a plurality of working entities —, which working entity is to be alternately circuited. The alternate circuit requests are likewise prioritized in the priority tables. For example, there is a high-priority request from a user. Since a high priority is assigned to this alternate circuit request, it is thus switched with priority. An alternate circuit request controlled by the working entity is thus rejected.

The central control devices of the switching equipment W and E exchange information in an alternate circuiting protocol ES. This protocol is transmitted via the protection entity and is taken by the allocated monitoring means $UE_0$ of the respectively receiving switching equipment and supplied to the appertaining central control means. Further, the central control means sees to it that the switch devices $S_0$ and $S_1$ are appropriately controlled in case of a malfunction.

Information with respect to the momentary statusses of the switching equipment are deposited in the protocol ES. Further information with respect to the generated alternate circuiting request are also stored therein. The protocol is respectively exchanged between the two switching equipment given generation of the alternate circuiting request. It is provided in a specific development of the invention to cyclically transmit the protocol ES between the two switching equipment.

According to FIG. 1, the ATM cells are supplied to the switching equipment E in the intact operating case. The ATM cells thereby belong to the connection $WT_1$. The individual connections are distinguished on the basis of the logical connection number VPI that is entered in the header part of the ATM cells.

The switch devices $S_0$ and $S_1$ of the switching equipment W are switched such in this (still intact) operating instance that the ATM cells are supplied directly to the monitoring means $UE_1$. Here, the ATM cells are charged with the aforementioned control information and supplied via the working entity $WE_1$ to the monitoring means $UE_1$ of the receiving switching equipment E. The accompanying control information are checked therein and a malfunction is potentially identified. When the transmission has ensued correctly, the ATM cells are supplied to the ATM switching network SN. The logical connection information VPI is interpreted here and, depending on the criterion of this interpretation, the ATM cell is forwarded into the ATM network via the output of the switching network SN coming into consideration.

The protection entity PE can remain unused during this time. As warranted, however, special data (extra traffic) can also be supplied to the switching equipment E during this time as well. The switch device $S_0$ of the switching equipment W thus assumes the positions 1 or 3. The transmission of the special data likewise ensues in ATM cells. The monitoring means $UE_0$ of the switching equipment W charges the ATM cells with control information in the same way that was already described in the case of the working entity $WE_1$. The monitoring of the entity likewise ensues. Control data of a general type can thereby be employed as special data. Inventively, the special data can also be designed as specific traffic data. For example, ABR (available bit rate) or UBR (unspecified bit rate) traffic data thereby come into consideration since the services using these data are cost-beneficial.

It is assumed below that the working entity WE has failed. This is detected by the monitoring means $UE_1$ of the receiving switching equipment E allocated thereto. The alternate circuiting request is then communicated to the appertaining central control means and deposited thereat in the local priority table as well as in the global priority table.

Based on the criterion of the priorities stored in the global priority table, a determination is then made as to whether requests with even higher priority are pending. For example, this could be the switchover request of the user (forced switch for working entity) that has already been addressed. When no requests with higher priority are present, the switch device $S_1$ of the switching equipment E is switched into the remaining operating condition, as shown in FIG. 1. Subsequently, the alternate circuiting protocol Es is supplied to the switching equipment W via the protection entity PE. The information that have already been addressed are contained in this alternate circuiting protocol. It is critical that the local priority logic defines the configuring of the information with respect to the generated alternate circuiting request and the global priority logic defines the position of the switch means $S_0$.

The monitoring means $UE_0$ of the switching equipment E now accepts the alternate circuiting protocol ES and supplies it to the central control means of the switching equipment W. When other requests having higher priority are also not present here in the global priority table, then the switch device $S_1$ here is also driven and set in a corresponding way. The switch device $S_0$ of the switching equipment W is likewise switched over. The new status of the two switch devices $S_0$ and $S_1$ is acknowledged to the switching equipment E and updated in the global priority table thereat. The ATM cells of the connection $WT_1$ are thus supplied to the switching equipment E via the protection entity PE.

FIG. 2 discloses a configuration on which the inventive method is executed. The switching equipment are thereby connected such that a closed ring is provided. According to the present exemplary embodiment, this ring should be constructed of linear connection sections, as shown according to FIGS. 1a and 1b. As known, this is the 1:1 structure.

Accordingly, a plurality of switching equipment can be derived from FIG. 2. These are the switching equipment $N_A$, $N_B$, $N_C$ and $N_D$. Respectively two of these switching equipment thereby terminate transmission sections. With reference to the example of the switching equipment $N_A$ and $N_D$, these are the working entity $WE_{A-D}$ as well as the protection entities $PE_{C-D}$ and $PE_{C-B}$. The two switching equipment $N_A$ and $N_B$ terminate the connecting sections $PE_{A-D}$ and $P_{EC-D}$ as well as $PE_{C-B}$ in the same way. As known, the latter are respectively allocated protection entities. According to FIG. 2 (as well as FIG. 3 and FIG. 4), the working entities are emphasized by a thicker line, whereas the protection entities are merely identified with a thin line.

Further, switch devices $S_1$ and SN that are identical to the switch devices disclosed according to FIGS. 1a and 1b can be derived from all switching equipment. For the sake of simpler understanding, a more detailed disclosure in the sense of a division into the switch devices $S_1$ and SN has been foregone here. Central control means (likewise not shown here in greater detail) having local and global priority tables are likewise arranged here in all switching equipment. The functioning was already explained in detail given the employment of a linear arrangement according to FIGS. 1a and 1b.

According to the present exemplary embodiment, it is then to be assumed that a connection $WT_{A-D}$ is to be routed between two subscriber terminal equipment via the ring. The ATM cells belonging to this connection are supplied to the switching equipment $N_A$ and conducted via the respectively active working entity $W_{EA-D}$ to the switching equipment $N_D$, where the ATM cells belonging to the connection $WT_{A-D}$ in turn leave the ring.

According to FIG. 2, an arrow indicates the direction in which these ATM cells enter into and in turn depart from the ring. Since this connection, however, is a bidirectional connection, the ATM cells belonging to the appertaining return direction are routed via the same connecting sections. This means that the ATM cells belonging to the return direction enter into the ring via the switching equipment ND, are conducted via the connection $WE_{A-D}$ to the switching equipment $N_A$ and in turn leave the ring thereat. For greater clarity, however, only one direction is shown below.

The same is true for the further connections $WT_{C-B}$ as well as $WT_{C-D}$ shown according to FIG. 2. The ATM cells belonging to the three connections $WT_{A-D}$, $WT_{C-B}$ as well as $WT_{C-D}$ shown here are transmitted via the respectively active working entities $WE_{A-D}$, $WE_{C-B}$ as well as $WE_{C-D}$. The protection entities $PE_{A-D}$, $PE_{C-B}$ as well as $PE_{C-D}$ belonging thereto remain initially unaffected.

FIG. 3 shows how a malfunction is to be handled according to the measures of the inventive method. This ensues with reference to the example of the connection $WT_{A-D}$. It is thus assumed that the transmission section between the switching equipment $N_A$ and $N_D$ is influenced by a malfunction. It is also assumed that this should initially be the only malfunction in the ring. The switching equipment $N_A$ is informed of the malfunction by exchanging the alternate circuiting protocol ES via the protection entity $PE_{A-D}$. According to the criterion of evaluating the local and global priorities, the switch means S of the switching equipment $N_A$ is switched into the remaining operating condition. Subsequently, the ATM cells belonging to the connection $WE_{A-D}$ are supplied via this protection entity $PE_{A-D}$ as well as the switching equipment $N_B$ and $N_C$ to the switching equipment $N_D$, where they leave the ring.

Inventively, a common transmission capacity for the alternate circuit which is used in common is reserved for connecting sections placed between two switching equipment. This is possible because it is assumed that only one transmission section of the ring is malfunctioning. For example, respectively 140 Mbit/sec could be allocated to the connections $WT_{A-D}$, $WT_{C-B}$ and $WT_{C-D}$. 140 Mbit/sec would thus be allocated for all three protection entities for the transmission section placed between the switching equipment $N_A$, $N_B$. This means that 140 Mbit/s are available on the allocated protection entity given the alternate circuiting of only one working entity. Similar considerations apply for the transmission sections placed between the switching equipment $N_B$, $N_C$. 140 Mbit/s would be reserved here in the same way, whereby a transmission capacity of 140 Mbit/s would be available in full scope given alternate circuiting of only one working entity on the allocated protection entity.

Such a procedure has, in particular, the advantage that fewer fees for transmission capacity need be reported per connection. This would be different in case of dedicated protection. The saving effect is most beneficial in that case wherein a connection is set up between neighboring switching equipment. This, for example, is the case for the connection $WT_{A-D}$ between the switching equipment $N_A$ and $N_D$. The saving effect is greatest here because the appertaining protection entities have to be conducted to the switching equipment $N_D$ via the two other switching equipment $N_B$ and $N_C$. The same is true of the other connections $WT_{C-B}$ and $WT_{C-D}$ that are shown.

The saving effect over a dedicated protection would be least when the switching equipment $N_A$ is fashioned as a switching level of a higher hierarchy level. In this case, all traffic of the other switching equipment would be conducted via this higher-ranking switching equipment $N_A$.

A medium saving effect would derive in that case wherein each of the switching equipment can communicate with every communication equipment in the sense of a complete meshing.

It is critical that special data of a general type, as explained in conjunction with FIG. 1, cannot be transmitted over the ring. In particular, these are the control data of a general type addressed there. Inventively, however, the special traffic data that is fashioned as special data can be transmitted on the basis of their own priority allocated to them. For example, ABR (available bit rate) or UBR (unspecified bit rate) traffic data thereby come into consideration.

In conclusion, let a further malfunction be shown by way of example with reference to FIG. 4. In addition to a singly occurring malfunction, as shown in the case of FIG. 3, a malfunction could additionally ensue on the connecting path $WE_{C-B}$. Further alternate circuiting protocols are exchanged in this case. In this case, however, both the working entity as well as the protection entity is affected by a disturbance. Due to the common reservation of transmission capacity for protection entities, connections that are not influenced by the disruption would also be affected given alternate circuiting of both affected working entities onto the respective protection entity. Since a switchover would yield no advantage in this case, since the protection entity is also malfunctioning, a switchover is foregone in case of the appearance of double errors.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for alternate circuiting of transmission equipment in ring architectures for bidirectional transmission of ATM cells, comprising the steps of:
    providing a transmission section including at least one of working entities and protection entities;
    terminating said transmission section with at least two switching equipment: supplying information in ATM cell between said at least two switching equipment over said transmission section;
    rerouting the ATM cells onto the protection entity according to priority criteria and logical connection information given a malfunction on the appertaining transmission section;
    linking a plurality of switching equipment into the transmission section;
    merging the at least two switching equipment;
    allocating a protection entity to each working entity; and
    dividing a transmission capacity reserved in common between a plurality of protection entities.

2. A method for alternate circuiting of transmission equipment in ring architectures for bidirectional transmission of ATM cells, comprising the steps of:
    providing a transmission section including at least one of working entities and protection entities;
    terminating said transmission section with at least two switching equipment;
    supplying information in ATM cell between said at least two switching equipment over said transmission section;
    rerouting the ATM cells onto the protection entity according to priority criteria and logical connection information given a malfunction on the appertaining transmission section;
    linking a plurality of switching equipment into the transmission section;
    merging the at least two switching equipment; and
    generating an alternate circuiting request to which further priorities are allocated in the alternate circuiting case.

3. A method for alternate circuiting of transmission equipment in ring architectures for bidirectional transmission of ATM cells, comprising the steps of:
    providing a transmission section including at least one of working entities and protection entities;
    terminating said transmission section with at least two switching equipment;
    supplying information in ATM cell between said at least two switching equipment over said transmission section;
    rerouting the ATM cells onto the protection entity according to priority criteria and logical connection information given a malfunction on the appertaining transmission section;
    linking a plurality of switching equipment into the transmission section;
    merging the at least two switching equipment; and
    providing local and global priority tables in which the rank of the priorities is determined.

4. A method for alternate circuiting of transmission equipment in ring architectures for bidirectional transmission of ATM cells, comprising the steps of:
    providing a transmission section including at least one of working entities and protection entities;
    terminating said transmission section with at least two switching equipment;
    supplying information in ATM cell between said at least two switching equipment over said transmission section;
    rerouting the ATM cells onto the protection entity according to priority criteria and logical connection information given a malfunction on the appertaining transmission section;
    linking a plurality of switching equipment into the transmission section;
    merging the at least two switching equipment; and
    generating an alternate circuiting protocol upon arrival of an alternate circuiting request in receiving switching equipment, the alternate circuiting protocol being supplied only once to the transmitting switching equipment via the protection entity.

5. A method for alternate circuiting of transmission equipment in ring architectures for bidirectional transmission of ATM cells, comprising the steps of:
    providing a transmission section including at least one of working entities and protection entities;
    terminating said transmission section with at least two switching equipment;
    supplying information in ATM cell between said at least two switching equipment over said transmission section;
    rerouting the ATM cells onto the protection entity according to priority criteria and logical connection information given a malfunction on the appertaining transmission section;
    linking a plurality of switching equipment into the transmission section;
    merging the at least two switching equipment;
    detecting total outage and degradation of said working entity in the monitoring means of receiving switching equipment; and
    dividing a transmission capacity reserved in common between a plurality of said protection entities.

6. A method for alternate circuiting of transmission equipment in ring architectures for bidirectional transmission of ATM cells, comprising the steps of:
    providing a transmission section including at least one of working entities and protection entities;

terminating said transmission section with at least two switching equipment;

supplying information in ATM cell between said at least two switching equipment over said transmission section;

rerouting the ATM cells onto the protection entity according to priority criteria and logical connection information given a malfunction on the appertaining transmission section;

linking a plurality of switching equipment into the transmission section;

merging the at least two switching equipment, wherein said alternate circuiting ensues by driving a switch means contained in the transmitting switching equipment as well as upon employment of a selection means arranged in the receiving switching equipment; and dividing a transmission capacity reserved in common between a plurality of said protection entities.

7. A method for alternate circuiting of transmission equipment in ring architectures for bidirectional transmission of ATM cells, comprising the steps of:

providing a transmission section including at least one of working entities and protection entities;

terminating said transmission section with at least two switching equipment;

supplying information in ATM cell between said at least two switching equipment over said transmission section;

rerouting the ATM cells onto the protection entity according to priority criteria and logical connection information given a malfunction on the appertaining transmission section;

linking a plurality of switching equipment into the transmission section;

merging the at least two switching equipment; and transmitting special data over the protection entity during malfunction-free times.

8. A method for alternate circuiting of transmission equipment in ring architectures for bidirectional transmission of ATM cells, comprising the steps of:

providing a transmission section including at least one of working entities and protection entities;

terminating said transmission section with at least two switching equipment;

supplying information in ATM cell between said at least two switching equipment over said transmission section;

rerouting the ATM cells onto the protection entity according to priority criteria and logical connection information given a malfunction on the appertaining transmission section;

linking a plurality of switching equipment into the transmission section; and merging the at least two switching equipment, wherein said special data are one of available bit rate traffic data and unspecified bit rate traffic data.

9. A method for alternate circuiting of transmission equipment in ring architectures for bidirectional transmission of ATM cells, comprising the steps of providing a transmission section including at least one of working entities and protection entities;

terminating said transmission section with at least two switching equipment;

supplying information in ATM cell between said at least two switching equipment over said transmission section;

rerouting the ATM cells onto the protection entity according to priority criteria and logical connection information given a malfunction on the appertaining transmission section;

linking a plurality of switching equipment into the transmission section;

merging the at least two switching equipment, wherein the selection means is one of an asynchronous transfer mode switching network and a simple switch element; and dividing a transmission capacity reserved in common between a plurality of said protection entities.

10. A method for alternate circuiting of transmission equipment in ring architectures for bidirectional transmission of ATM cells, comprising the steps of:

providing a transmission section including at least one of working entities and protection entities;

terminating said transmission section with at least two switching equipment;

supplying information in ATM cell between said at least two switching equipment over said transmission section;

rerouting the ATM cells onto the protection entity according to priority criteria and logical connection information given a malfunction on the appertaining transmission section;

linking a plurality of switching equipment into the transmission section;

merging the at least two switching equipment;

cyclically exchanging an alternate circuiting protocol between the transmitting switching equipment and the receiving switching equipment; and dividing a transmission capacity reserved in common between a plurality of said protection entities.

11. A method for alternate circuiting of transmission equipment in ring architectures for the bidirectional transmission of ATM cells, comprising the steps of:

forming a ring guiding system of a plurality of switching equipment via which information is supplied in ATM cells;

guiding at least one of operating paths and alternative paths between said plurality of switching equipment;

allocating an alternative path to an operating path;

rerouting the ATM cells subsequently transmitted over said operating path onto the allocated alternative path in case of a malfunction on one of the operating paths; and sharing a transmission capacity reserved in common among a plurality of alternative paths.

12. A method according to claim 11, wherein the logical connection information is at least one of the number of a virtual channel and the number of a virtual path and the number of a virtual path group that is formed of a plurality of virtual paths.

13. A method according to claim 11, wherein the switching equipment are cross-connect switch devices.

14. A method according to claim 11, further comprising the step of:

guiding operating paths and alternative paths via different switching centers.

* * * * *